US008042959B2

(12) United States Patent
Maxwell et al.

(10) Patent No.: US 8,042,959 B2
(45) Date of Patent: Oct. 25, 2011

(54) FORWARD FOLDING MIRROR ASSEMBLIES

(75) Inventors: Kurt Hugh Maxwell, Farmington Hills, MI (US); Alfredo N. DiMichele, Farmington Hills, MI (US); Chandana J. DeSilva, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 429 days.

(21) Appl. No.: 12/393,325

(22) Filed: Feb. 26, 2009

(65) Prior Publication Data
US 2010/0214680 A1 Aug. 26, 2010

(51) Int. Cl.
G02B 5/08 (2006.01)
(52) U.S. Cl. ........................................................ 359/841
(58) Field of Classification Search .................. 359/841, 359/843, 871, 872, 877
See application file for complete search history.

(56) References Cited

U.S. PATENT DOCUMENTS

| 4,606,619 A | 8/1986 | Yamana |
| 5,497,273 A * | 3/1996 | Kogita et al. ................. 359/843 |
| 5,940,230 A | 8/1999 | Crandall |
| 2004/0141245 A1 | 7/2004 | Olijnyk et al. |

* cited by examiner

Primary Examiner — Euncha Cherry
(74) Attorney, Agent, or Firm — Young Basile Hanlon & MacFarlene, P.C.

(57) ABSTRACT

Disclosed herein are embodiments of vehicles having forward folding door mirror assemblies. One such embodiment of a vehicle comprises a mirror assembly mounted to a vehicle door and configured to rotate about a substantially vertical axis between at least a first position in which the mirror assembly is extended away from the vehicle door for use while driving and a second position in which the mirror assembly is folded forward toward a front end of the vehicle. The vehicle also comprises a mechanism coupled to the mirror assembly and to a vehicle body and responsive to an opening of the vehicle door to rotate the mirror assembly about the substantially vertical axis from the second position to the first position when the door is opened. Also disclosed herein are mirror assemblies and methods of protecting door-mounted mirrors on vehicles.

20 Claims, 7 Drawing Sheets

FIG. 9
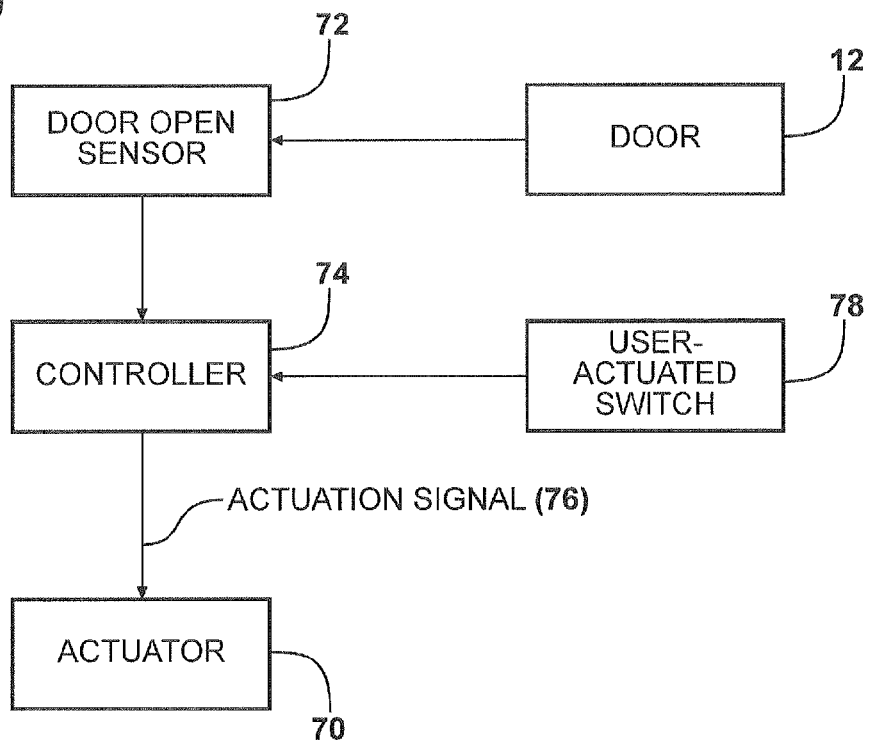
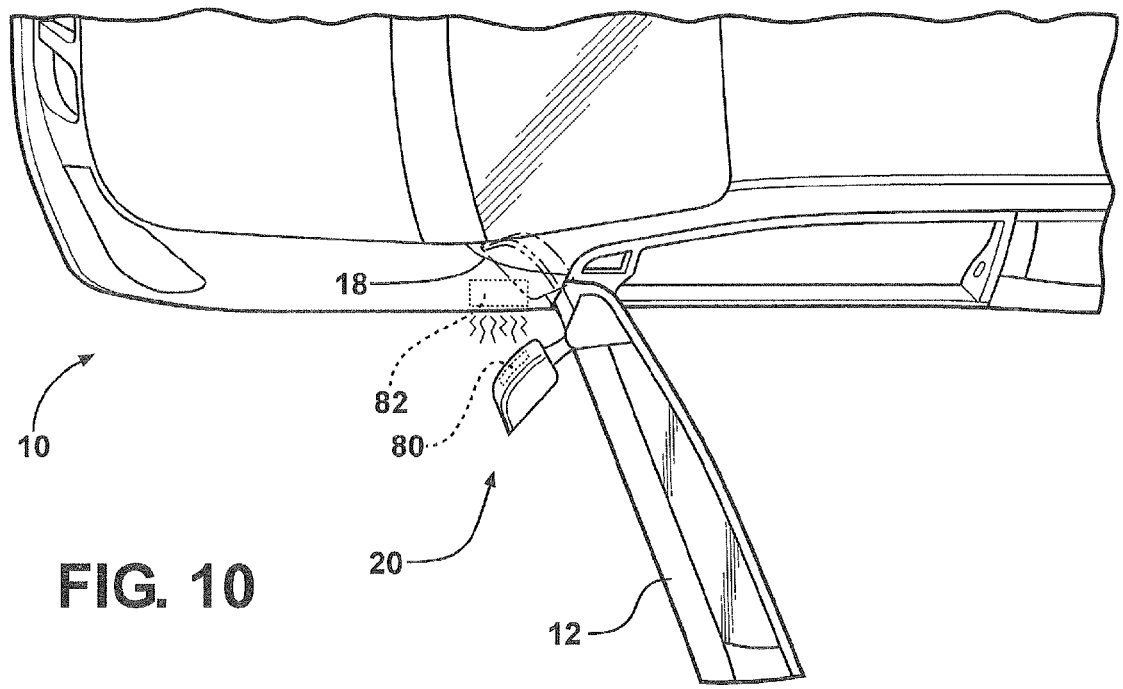
FIG. 10

| ROTATING THE MIRROR FORWARD DURING IMPACT AT LEAST 45 DEGREES | S10 |

| OPENING THE DOOR UPON WHICH THE MIRROR IS MOUNTED | S20 |

| USING A DRIVE MECHANISM WHICH IS AT LEAST PARTIALLY LOCATED WITHIN A MIRROR ASSEMBLY TO AUTOMATICALLY ROTATE THE MIRROR REARWARD TOWARD THE FIRST OPERATIONAL POSITION AS THE DOOR OPENS SO THAT THE MIRROR DOES NOT IMPACT THE VEHICLE BODY. | S30 |

FORWARD FOLDING MIRROR ASSEMBLIES

FIELD OF THE INVENTION

The present invention pertains to forward folding mirror assemblies and vehicles having a forward folding mirror assembly, and more particularly to forward folding mirror assemblies with damage prevention mechanisms.

BACKGROUND

Side view mirrors customarily provide the driver of a vehicle with vision of traffic and other objects to the rear and side of the vehicle. Side view mirrors extend from either side of the vehicle, typically mounted on the vehicle door. To provide a smaller span of the vehicle to, for example, fit into tight spaces, side view mirrors are known to fold in toward the rear of the vehicle. The mirrors can be manually moved by a user or can be automated to move, for example, when the user touches a switch or button. The capability to fold in toward the rear of the vehicle can also prevent damage to the mirror such as when a vehicle is parked in the street.

Some side view mirrors can also be moved toward the front of a vehicle. However, the forward movement is typically limited and is not enough to prevent damage to the mirror if hit on the reflective surface side of the side view mirror. The limitation on the degree of forward folding is due in part to the forward folded mirror's interference with opening the door when too far forward.

SUMMARY

Embodiments of vehicles having forward folding door mirror assemblies are disclosed herein. One such embodiment of a vehicle comprises a mirror assembly mounted to a vehicle door and configured to rotate about a substantially vertical axis between at least a first position in which the mirror assembly is extended away from the vehicle door for use while driving and a second position in which the mirror assembly is folded forward toward a front end of the vehicle. The vehicle also comprises a mechanism coupled to the mirror assembly and to a vehicle body and responsive to an opening of the vehicle door to rotate the mirror assembly about the substantially vertical axis from the second position to the first position when the door is opened.

Embodiments of side mirror assemblies are disclosed herein. One such embodiment of a side mirror assembly for a vehicle having a door mounted to a vehicle body comprises a mirror having a reflecting surface and a housing that supports the reflecting surface, the mirror pivotally mounted to the door to rotate between at least a first position in which the reflecting surface of the mirror extends in a direction that forms an angle of at least 45 degrees with a longitudinal axis of the vehicle, and a second position in which the reflecting surface of the mirror extends in a direction that forms an angle of less than 45 degrees with the longitudinal axis of the vehicle. The assembly also comprises a mechanism coupled to the mirror and the door and responsive to the door to rotate the mirror from the second position to the first position when the door is opened.

Embodiments of methods for protecting vehicle door mounted mirrors from damage are disclosed herein. One embodiment of a method for protecting a door-mounted mirror on a vehicle during and after an impact comprises rotating the mirror forward during the collision at least 45 degrees from a first operational position to a second position in which the mirror is folded toward a portion of the vehicle body located forward of the door, opening the door upon which the mirror is mounted and using a drive mechanism which is at least partially located within the mirror assembly to automatically rotate the mirror rearward toward the first operational position as the door opens so that the mirror does not impact the vehicle body.

Other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein:

FIG. 9 is a schematic of a controller used to control the embodiment of FIG. 8;

FIG. 10 is a top plan view of a vehicle having a mirror assembly in accordance with another embodiment of the invention;

DETAILED DESCRIPTION

Figure 1:
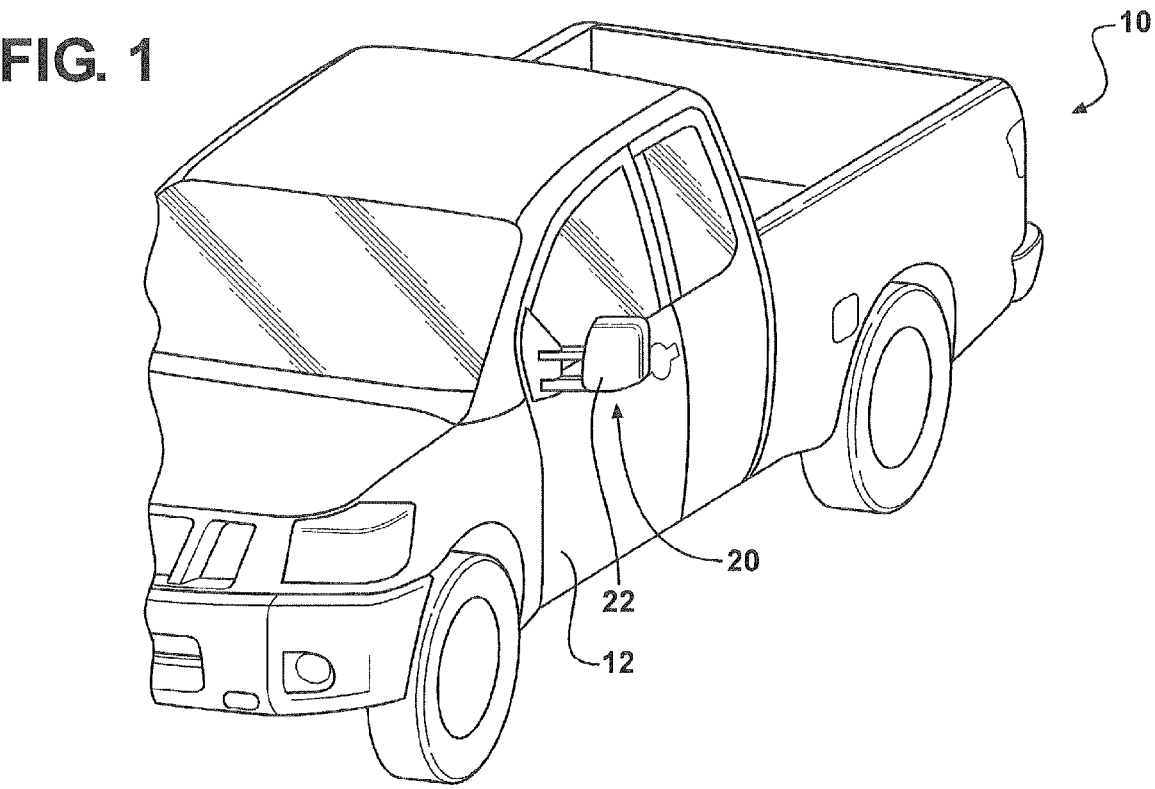
FIG. 1 is a perspective view of a vehicle with a mirror assembly in accordance with an embodiment of the invention.
Figure 2:
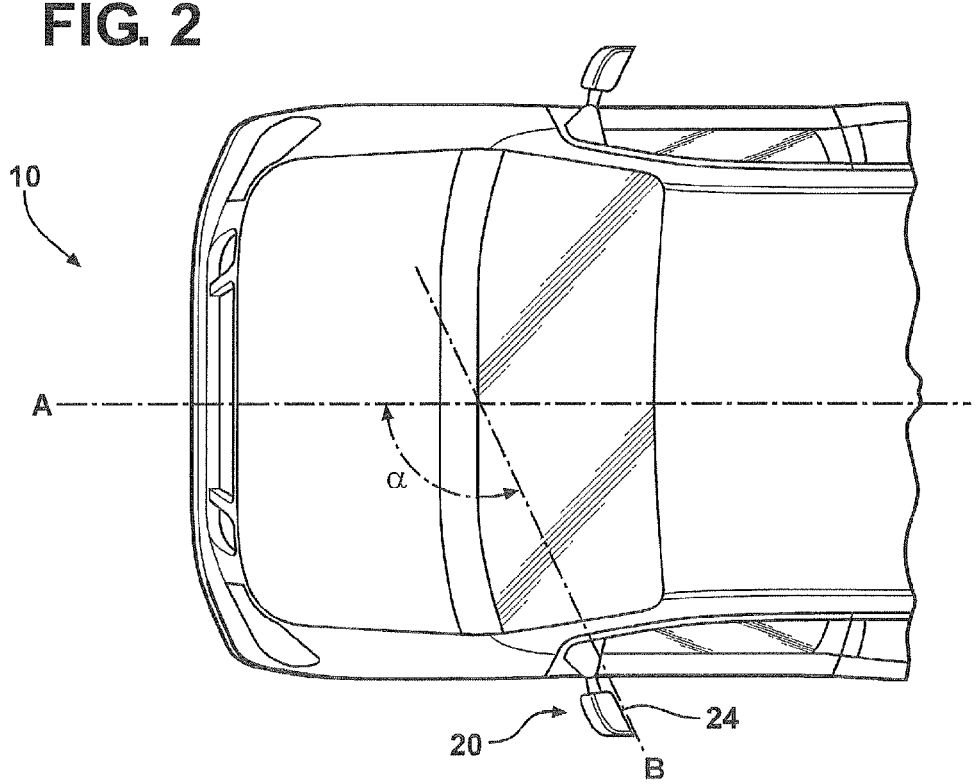
FIG. 2 is a top plan view of the vehicle of FIG. 1.

FIG. 1 is a perspective view of a vehicle 10 with an embodiment of a mirror assembly 20. The mirror assembly 20 is shown mounted to a vehicle door 12. FIG. 2 is a top plan view of the vehicle 10 of FIG. 1. Broken line A represents the longitudinal axis of the vehicle. The longitudinal axis A of the vehicle 10 can be any axis of the vehicle running between the front and rear of the vehicle. The mirror assembly 20 is shown in a first position in which the mirror assembly 20 is extended away from the vehicle door 12 for use while driving. In the first position, the mirror assembly 20 extends in a direction that forms an angle α of at least 45 degrees with the longitudinal axis A of the vehicle 10. Angle α is measured where the line B running parallel to a reflecting surface 24 of the mirror assembly 20 meets the longitudinal axis A of the vehicle 10, as shown in FIG. 2. The longitudinal axis A and the line B parallel to the reflecting surface 24 are used to illustrate the first and second positions of the mirror assembly 20 only and are not meant to limit the invention in any way.

The vehicle 10 shown in the Figures is provided by way of example and not limitation. Any vehicle having at least one side view mirror is contemplated, including sedans, SUVs, pick-up trucks, RVs and the like. Description of the mirror assembly 20 is made with reference to one side view mirror. However, more than one or all of the side view mirrors may comprise the mirror assembly embodiments disclosed herein. Furthermore, a housing 22 shown in the Figures is provided by way of example and is not meant to be limiting. Any housing structure can be used as desired or required by those skilled in the art. As shown, the mirror assembly 20 does not aesthetically impact the vehicle 10, as components of the mirror assembly 20 can be encased in the housing 22 of the mirror assembly 20.

Figure 3:
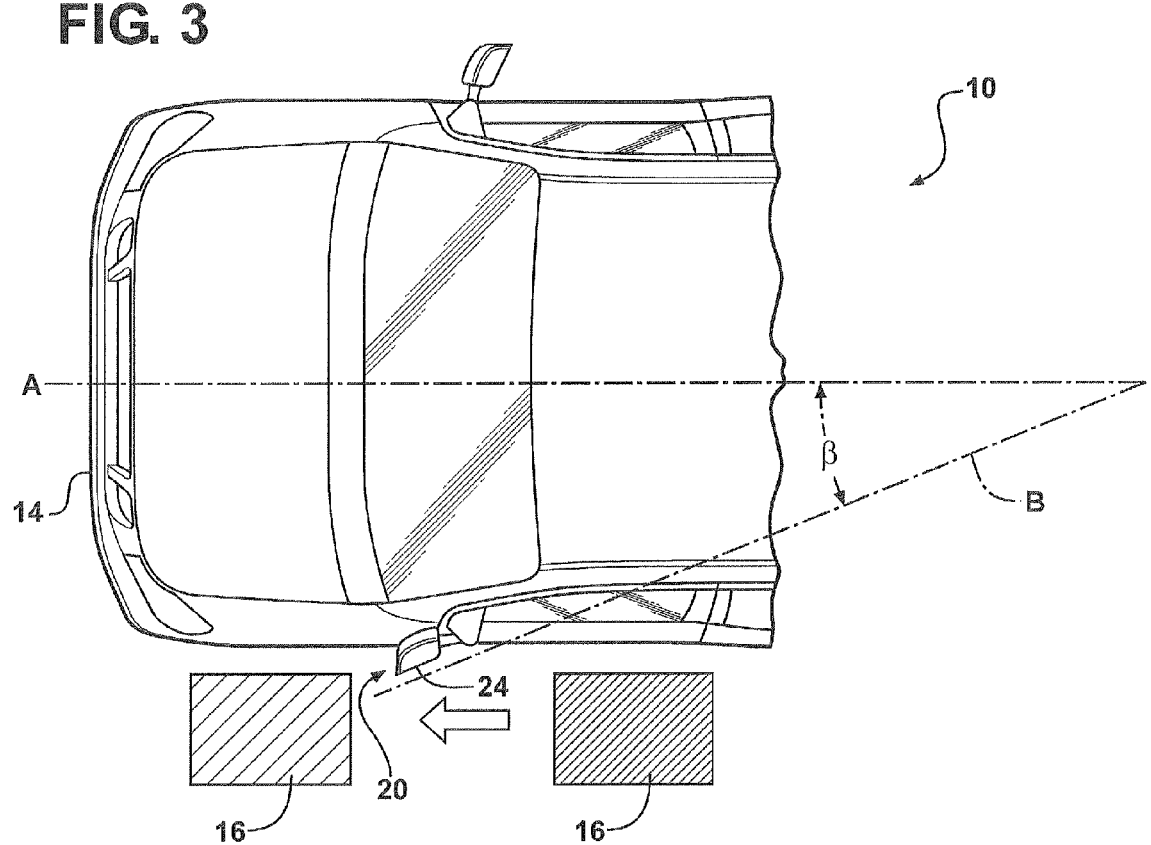
FIG. 3 is a top plan view of the vehicle of FIG. 1 after a collision in which the driver's side mirror has been rotated from an extending driving position to a forward folded position.

FIG. 3 is a top plan view of the vehicle 10 of FIG. 1 with the mirror assembly 20 in a second position in which the mirror assembly 20 is folded forward toward a front end 14 of the vehicle 10. In the second position, the line B running parallel to the reflecting surface 24 of the mirror assembly 20 extends in a direction that forms an angle β of less than 45 degrees with the longitudinal axis A of the vehicle 10, as shown in FIG. 3.

The mirror assembly 20 can be rotated to the second position in a number of ways. As illustrated in FIG. 3, an object 16 can impact the reflecting surface 24 side of the mirror assembly 20, thereby forcing the mirror assembly 20 to rotate from the first position to the second position. The object 16 may be moving in the direction of the arrow while the vehicle 10 is stationary. The object 16 may be stationary while the vehicle 10 is moving in a direction opposite the arrow. Both the object 16 and vehicle 10 may be moving in opposing directions, or in the same direction at different speeds. The mirror assembly 20 can be forced into the second position by a user of the vehicle 10, for example, to maneuver the vehicle 10 into an area with very little clearance. Other means of forcing the mirror assembly 20 into the second position are contemplated. The scenarios provided are examples and are not meant to be limiting.

Figure 4:
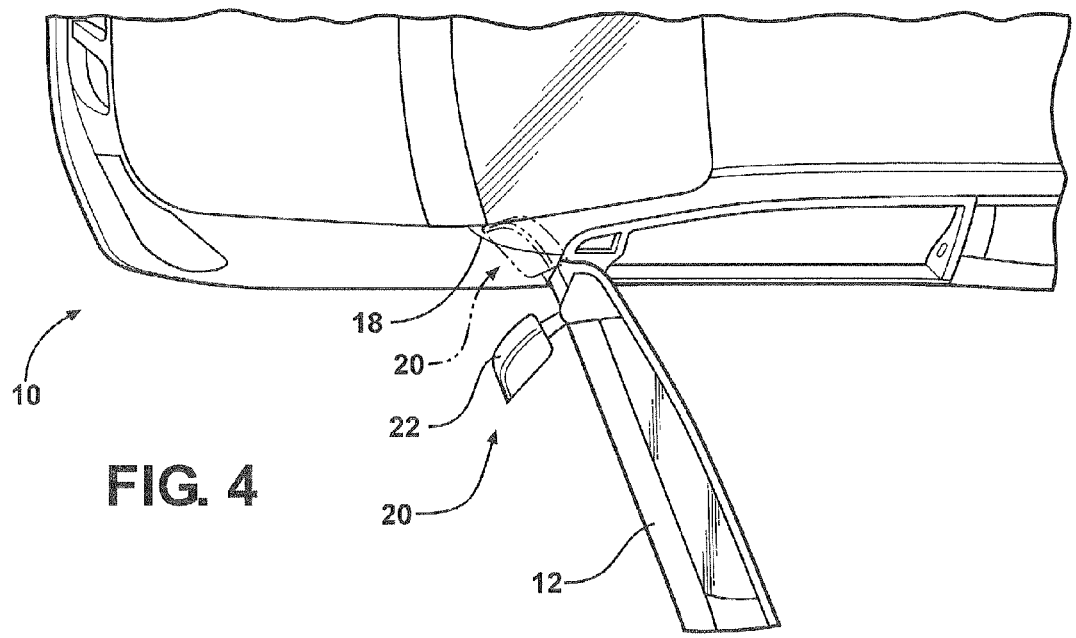
FIG. 4 is a top plan view of the vehicle of FIG. 3 after an impact, in which the driver's side door is open, illustrating the repositioning of the side mirror in accordance with the invention and (in phantom) the position of the side mirror without such repositioning.

FIG. 4 is a top plan view of the vehicle 10 of FIGS. 1 and 3. In FIG. 4, the vehicle door 12 is shown in both the closed position and the open position. FIG. 4 illustrates the repositioning of the mirror assembly 20 when the door 12 is opened and the mirror assembly 20 is in its first position and in its second position (shown in phantom). When the door 12 is open, the mirror assembly 20 in the first position does not contact the vehicle body 18 forward of the door, leaving plenty of clearance between the housing 22 and the vehicle body 18 even when the door 12 is fully open. However, as seen by the phantom mirror assembly 20, when the door 12 opens and the mirror assembly is in the second position, the housing 22 and the vehicle body 18 contact each other. This contact can have negative results. One or both of the mirror assembly 20 and the vehicle body 18 can be damaged. Alternatively or additionally, the door 12 may be prevented from opening fully.

To prevent these negative results from occurring, the embodiments of the mirror assemblies herein comprise mechanisms configured to reposition the mirror assembly 20 into the first position as the vehicle door 12 opens, thereby avoiding contact between the mirror assembly 20 and the vehicle body 18.

Figure 5:
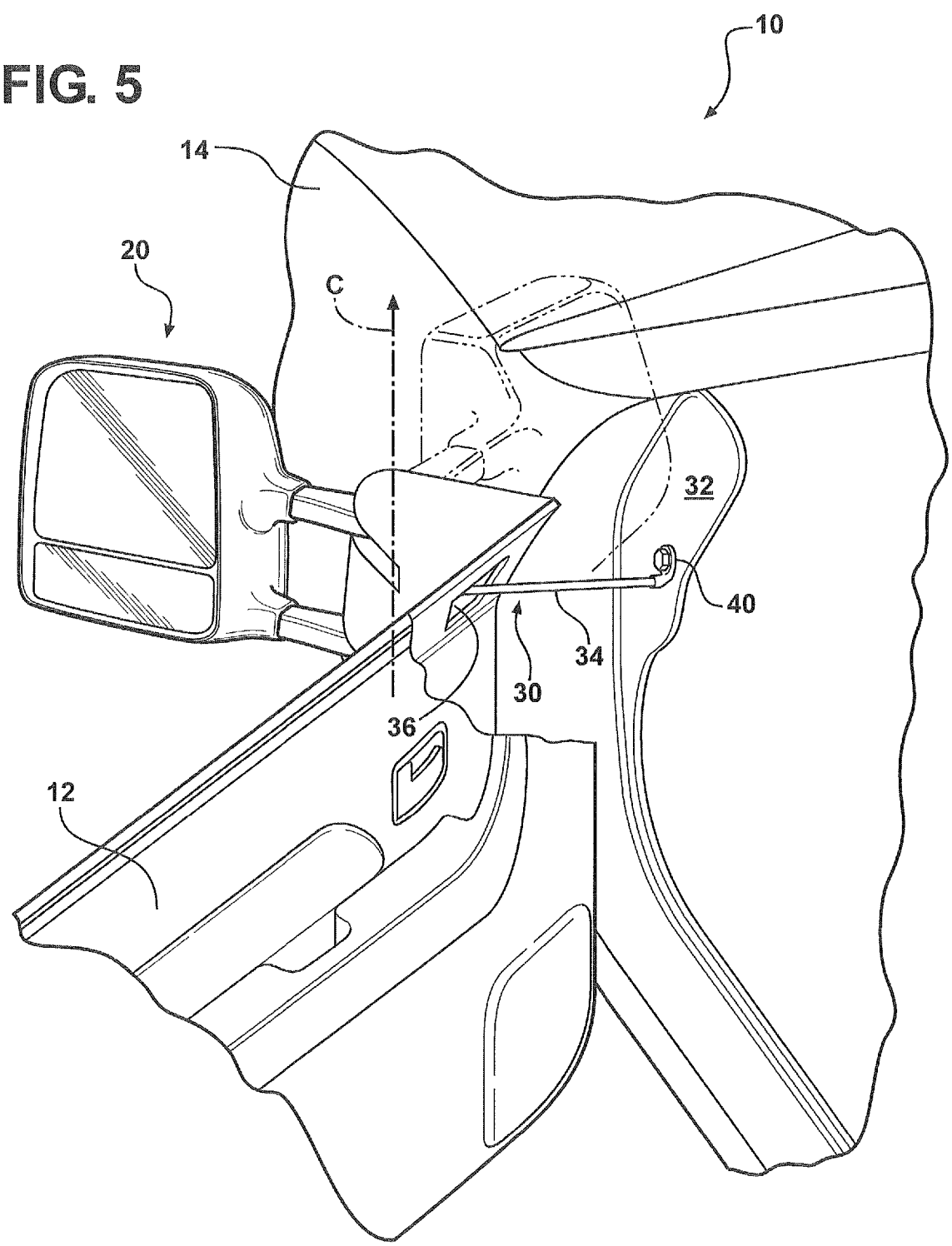
FIG. 5 is an enlarged perspective view of an embodiment of the mirror assembly of FIG. 3.

FIG. 5 is an enlarged perspective view of a vehicle having one embodiment of the mirror assembly 20. The vehicle 10 comprises a mirror assembly 20 mounted to a vehicle door 12 and configured to rotate about a substantially vertical axis C between at least the first position in which the mirror assembly 20 is extended away from the vehicle door 12 for use while driving and a second position in which the mirror assembly 20 is folded forward toward a front end 14 of the vehicle 10, both positions described in detail above. A mechanism 30 is coupled to the mirror assembly 20 and to a vehicle body 32. The mechanism 30 is responsive to the opening of the vehicle door 12 to rotate the mirror assembly 20 about the substantially vertical axis C from the second position to the first position when the door 12 is opened. The amount of rotation about the substantially vertical axis C that occurs by the mirror assembly 20 between the first and second position is between approximately 45 and 75 degrees relative to the vertical axis C.

In this embodiment, the mechanism 30 comprises a tether 34 passing through at least a portion 36 of the vehicle door 12. The tether 34 has a first end 38 (shown in FIG. 6) attached to the mirror assembly 20 and a second end 40 attached to the vehicle body 32. The first and second ends 38, 40 of the tether 34 can be attached to the mirror assembly 20 and body 34 in any manner known to those skilled in the art. As a non-limiting example, the ends may be bolted to the assembly and body. The tether 34 can be, for example, a cable, a spring and a cord. Other tethers known to those skilled in the art are contemplated.

Figure 6:
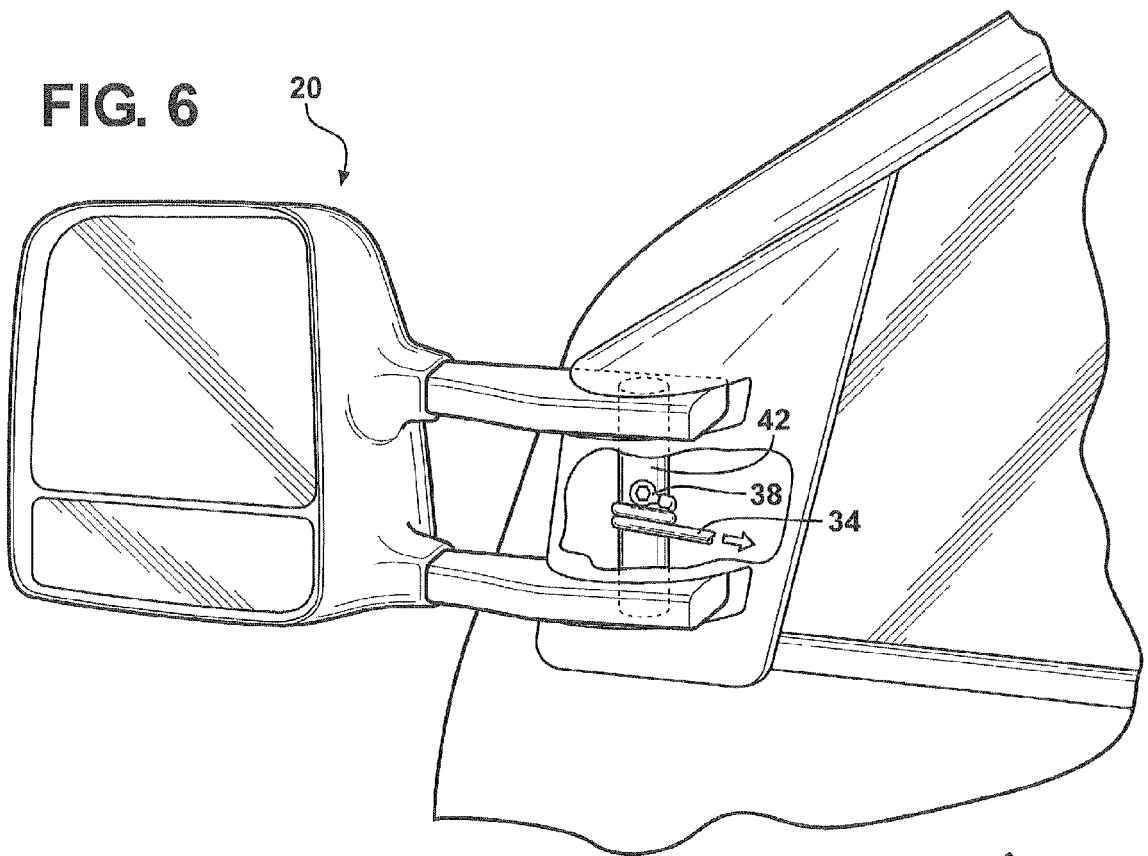
FIG. 6 is an enlarged perspective view of the mirror assembly of FIG. 5, with a portion cut away.

FIG. 6 is an enlarged perspective cut-away view of the mirror assembly shown in FIG. 5. The mirror assembly 20 has a rotatable shaft member 42. The first end 38 of the tether 34 is wrapped about the rotatable shaft member 42. When the vehicle door 12 is closed and the mirror assembly 20 is in the first position, the tether 34 is slack. As the mirror assembly 20 is moved to the second position from the first position, the shaft member 42 moves with the mirror assembly 20 and tightens the tether 34, eliminating the slack. As the door 12 is opened, the door and mirror assembly move away from the body 36 to which the second end 40 of the tether 34 is attached. The force on the tether 34 from the door 12 opening causes the first end 38 of the tether 34 to pull on the shaft member 42. When the force overcomes a spring (not shown) maintaining the shaft member 42 in a neutral position with respect to the mirror assembly, the shaft member rotates, unwinding the tether 34 until the tether 34 is taut. At this point, the door is not yet open all the way. As the door 12 continues to open, the taut tether 34 pulls on the shaft member 42, which in turn pulls on the mirror assembly 20 to move the mirror assembly 20 back to its first position before the door is in its fully open position. This prevents the mirror assembly 20 from contacting the vehicle body 18 forward of the vehicle door 12. When the door is closed, the spring forces the shaft member 42 to rotate back to its neutral position, leaving slack in the tether 34.

The spring is used by way of example to bias the shaft member to its neutral position, and it is not meant to be limiting. Any means of biasing the shaft member known to those skilled in the art can be used.

Figure 7:
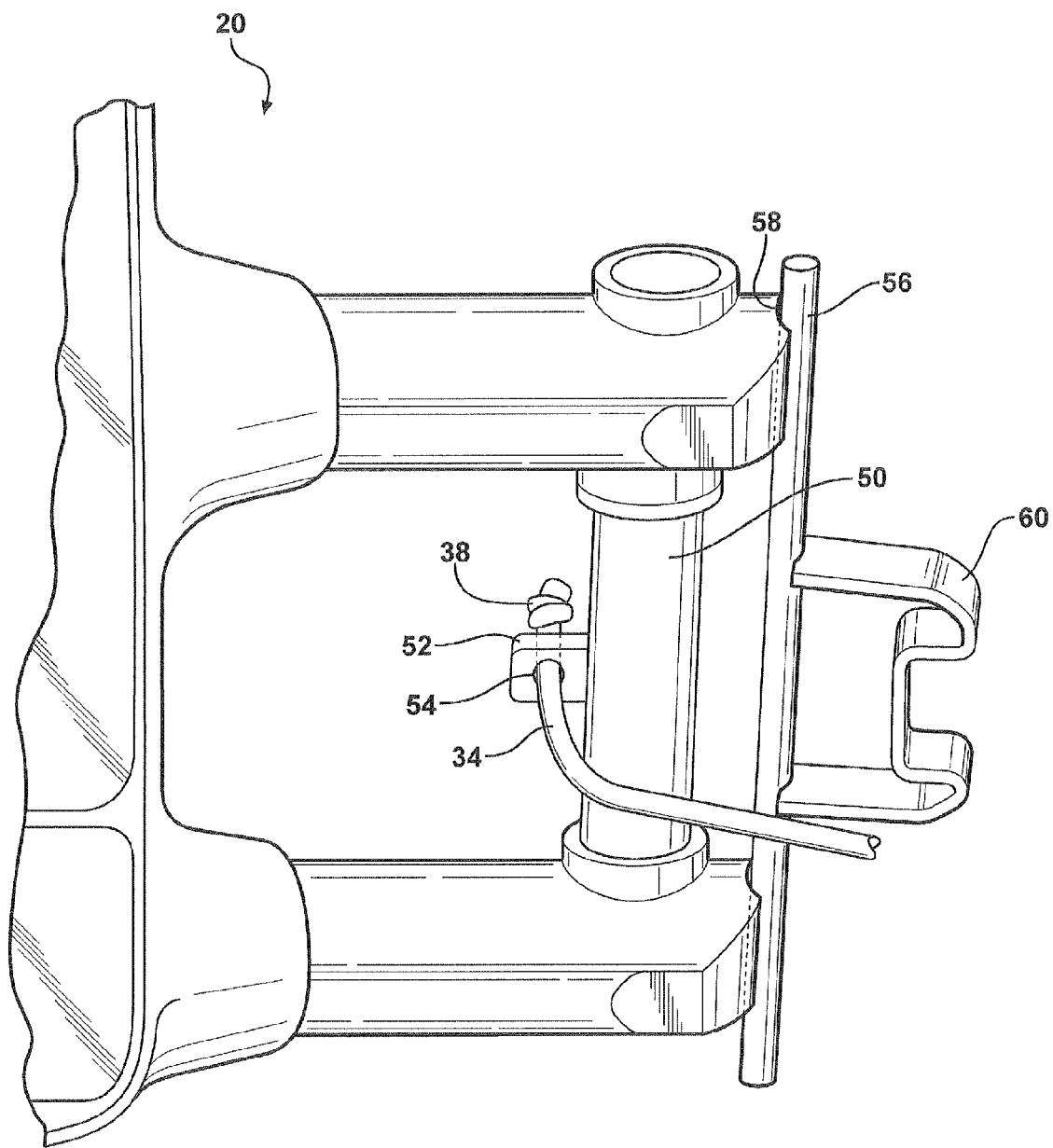
FIG. 7 is an enlarged perspective view of a mirror assembly in accordance with another embodiment of the invention, with a portion of the assembly cut away.

FIG. 7 illustrates an alternative tether mechanism for use with the vehicle and the mirror assembly described above. Rather than the rotatable shaft member described above, a lever 52 attached to the mirror assembly 20 is used. As shown in FIG. 7, the lever 52 extends substantially perpendicular from a non-rotatable shaft 50. This is provided by way of example and is not meant to be limiting, as the lever 52 can extend at an angle as desired or required. The lever 52 can also be attached to another portion of the mirror assembly 20. The lever 52 has an aperture 54 through which the first end 38 of the tether 34 it threaded. A bulge is provided on the first end 38 of the tether to prevent the first end 38 from returning through the aperture 54. As used herein, the term "bulge" means knotted or otherwise made larger than the aperture 54 to eliminate the first end of the tether from coming back through the aperture. The aperture 54 is preferably located on an end of the lever 52 to provide more distance of travel, but this is not required.

When the door 12 is closed and the mirror assembly 20 is in the first position, the tether 34 is slack. As the mirror assembly 20 is moved to the second position from the first position, the shaft 50 and lever 52 move with the mirror assembly 20 and tighten the tether 34. As the door 12 is opened, the door 12 and mirror assembly 20 move away from the body 36 to which the second end 40 of the tether 34 is attached, as shown in FIG. 5. As the door 12 opens, the tether becomes taut. The force on the tether 34 from the door 12 opening causes the first end 38 of the tether 34 to pull on the lever 52. As the bulged second end 40 of the tether 34 is forced up against the lever 52, the force causes the lever 52, shaft 50 and mirror assembly 20 to move back into the first position. By moving back to the first position, some slack is provided to the tether 34 so that the door 12 can be opened to its full position.

The length of the tether 34 must be determined so that the tether 34 is taut just prior to the mirror assembly 20 contacting the body 18 so that the movement of the mirror assembly 20 to the first position provides sufficient slack in the tether 34 to open the door 12 the remainder of the way.

Also shown in FIG. 7 are a detent 56 and a first notch 58. When the mirror assembly 20 is in its first position, the detent 56 is biased into the first notch 58 by a biasing member 60. The detent 56 and the first notch 58 assist in maintaining the mirror assembly 20 in the first position, and require a certain amount of force disengage the detent 56 from the notch 58 so that the mirror assembly can move freely. A second notch (not shown) is available to receive the detent 56 when the mirror assembly 20 is moved to its second position to maintain the mirror assembly 20 in this second position. The biasing member 60 can be configured to reduce the biasing force on the detent 56 when the door 12 is opening to facilitate disengagement of the detent from the notch so that the tether 34 does not have to overcome the entire biasing force of the biasing member 60 when moving the mirror assembly 20 from the second position to the first position.

The detent and notch biasing system can be incorporated with any of the embodiments described herein. The detent, notch and biasing member as shown by way of example and are not meant to be limiting. The detent can be any device used to mechanically resist or arrest the rotation of the mirror assembly. The biasing member can be any device to adjustably bias the detent device into a notch.

Figure 8:
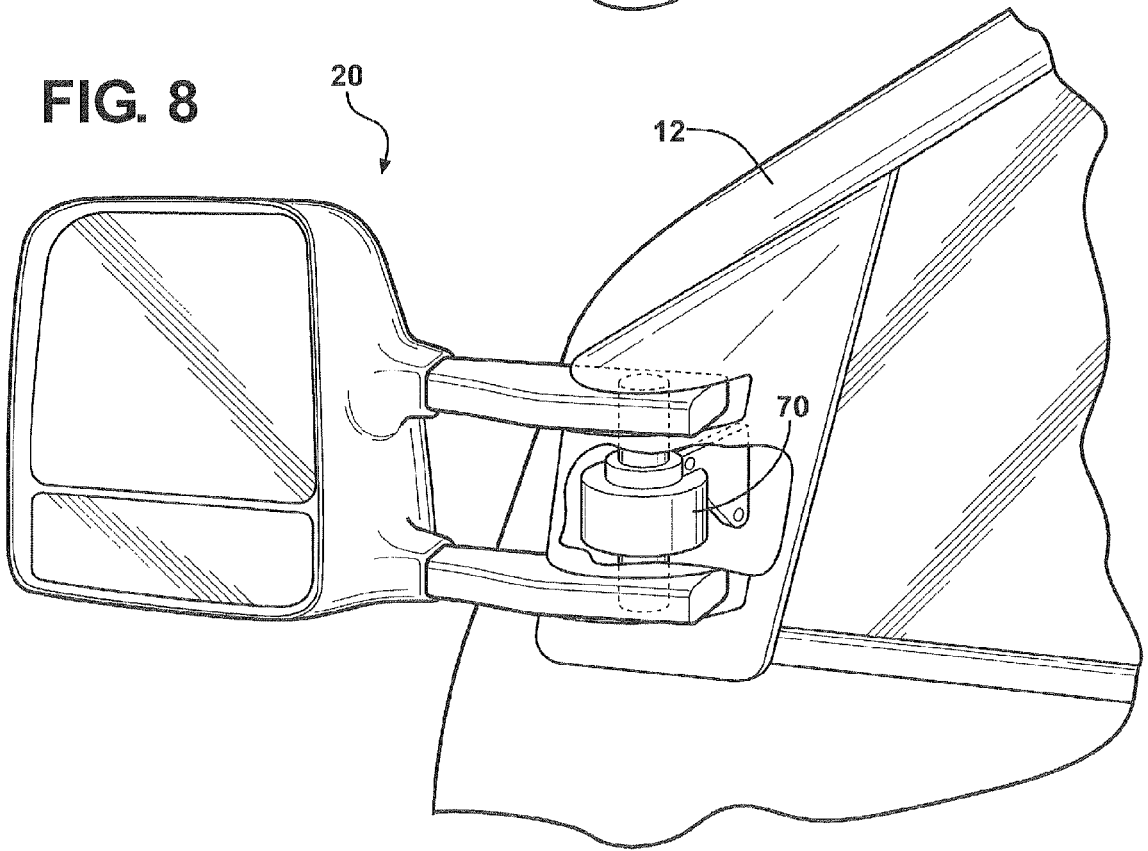
FIG. 8 is an enlarged perspective cut away view of a mirror assembly in accordance with another embodiment of the invention.

Another embodiment of mirror assembly and mechanism disclosed herein is illustrated in FIG. 8. FIG. 8 is an enlarged perspective cut-away view of the mirror assembly 20 to show an actuator 70 coupled to at least one of the mirror assembly 20 and the vehicle door 12. The actuator 70 is responsive to an actuator signal generated by a controller (not shown) responsive to a sensor (not shown) that detects a door open condition. The sensor can be any type of sensor known by those skilled in the art and can be positioned in a location to detect the door open condition. For example, the sensor can be located on the body 32 of the vehicle or on the vehicle door between the body and the door. The controller is also not limited and can be positioned with in the vehicle or mirror assembly as desired or required. The controller generates an actuation signal when the sensor senses the door opening. At this time, the actuator 70 responds to the actuator signal to move the mirror assembly 20 from the second position to the first position.

The vehicle 10 can further comprise a user-actuated control switch, wherein the controller is responsive to the user-actuated control switch to generate the actuation signal of the door opening. At this time, the actuator 70 responds to the actuator signal to move the mirror assembly 20 from the second position to the first position. The user-actuated control switch can be used in addition to the sensor described above, or can be alternative to the sensor. The switch can be located anywhere in the vehicle accessible by the user.

FIG. 9 is a schematic of a controller used to control the actuator 70 of FIG. 8. The door open sensor 72 senses the position of the vehicle door 12. The sensor communicates with the controller 74 and generates an actuation signal 76 for the actuator 70. As shown in FIG. 9, the user-actuated switch 78 is provided in addition to the door open sensor 72 and communicates the door 12 position to the controller 74. The controller 74 generates an actuation signal 76 for the actuator 70 when the door is opening.

Another embodiment of mirror assembly and mechanism for use with a vehicle disclosed herein is illustrated in FIG. 10. FIG. 10 is a top plan view of a vehicle 10 having a mirror assembly 20 having a mechanism comprising a first magnetic element 80 attached to the mirror assembly 20 and a second magnetic element 82 attached to the vehicle body 18. The second magnetic element 82 is positioned to be in close proximity to the first magnetic element 80 when the mirror assembly 20 is in the second position and the door is opened. The first and second magnetic elements 80, 82 are configured to exert a repulsive force on each other when placed in close proximity, thereby urging the mirror assembly 20 from the second position to the first position when the door 12 is opened. The first and second magnetic elements 80, 82 can be attached to the respective mirror assembly 20 and vehicle body 18 in any manner known to those skilled in the art. The magnetic elements 80, 82 can be sunk in to the respective assembly 20 and body 18 so that they are flush. The magnetic elements 80, 82 can be any size and shape desired or required that exert the required repulsive force.

Figures 11, 12:
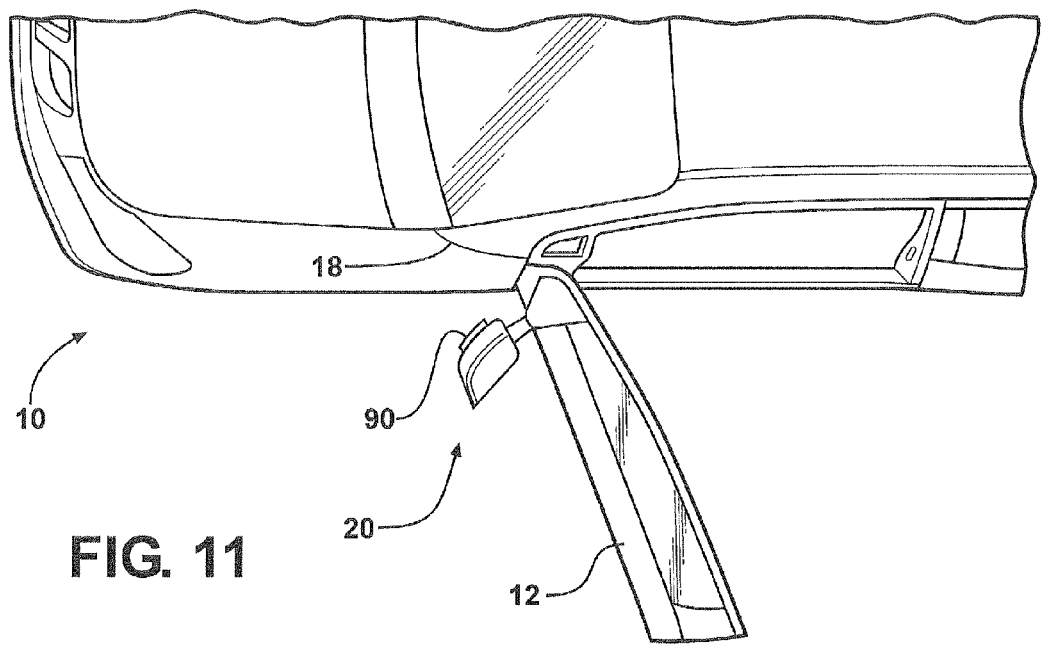
FIG. 11 is a top plan view of a vehicle having a mirror assembly in accordance with another embodiment of the invention.
FIG. 12 is a logic flow chart showing the operation of the mirror assembly during and after a collision.

Another embodiment of mirror assembly and mechanism for use with a vehicle disclosed herein is illustrated in FIG. 11. FIG. 11 is a top plan view of a vehicle 10 having a mirror assembly 20 having a mechanism comprising a resilient buffer material 90 placed on at least one of the outside of the mirror assembly 20 at a location that impacts the body 18 when the mirror assembly 20 is in the second position and the door 12 is opened, and the body 18 in a location that is impacted by the mirror assembly 20 when the mirror assembly 20 is in the second position and the door 12 is opened.

FIG. 11 illustrates the resilient buffer material 90 located on the mirror assembly 20 by way of example. It is also contemplated that resilient buffer material can be located on both the mirror assembly 20 and vehicle body 18. The resilient buffer material 90 can be attached to one or both of the mirror assembly 20 and body 18 by any manner known to those skilled in the art. The resilient buffer material 90 is not limited to a specific material, but can be, for example, foam or rubber.

Also disclosed herein are methods for protecting a door-mounted mirror on a vehicle during and after an impact. One such method is illustrated in the logic flow chart of FIG. 12. The method comprises rotating the door-mounted mirror forward during an impact, the rotation at least 45 degrees from a first operational position to a second position in which the mirror assembly is folded toward a portion of the vehicle body located forward of the door. (S10) The door upon which the mirror is mounted is then opened. (S20) Using a drive mechanism which is at least partially located within a mirror assembly, automatically rotating the mirror rearward toward the first operational position as the door opens so that the mirror does not impact the vehicle body. (S30)

Any embodiment of the mirror assembly and mechanism disclosed herein can be incorporated as the drive mechanism described above.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle comprising:
    a mirror assembly mounted to a vehicle door and configured to rotate about a substantially vertical axis between at least a first position in which the mirror assembly is extended away from the vehicle door for use while driving and a second position in which the mirror assembly is folded forward toward a front end of the vehicle; and
    a mechanism coupled to the mirror assembly and to a vehicle body and responsive to an opening of the vehicle door to rotate the mirror assembly about the substantially vertical axis from the second position to the first position when the door is opened.

2. The vehicle of claim 1, wherein the mechanism comprises:
    a tether passing through at least a portion of the door, the tether having a first end attached to the mirror assembly and a second end attached to the vehicle body.

3. The vehicle of claim 2, wherein the mirror assembly further comprises a lever extending from the mirror assembly, wherein the first end of the tether is attached to the lever.

4. The vehicle of claim 3, wherein the lever comprises an aperture and the first end of the tether is threaded through the aperture and bulged.

5. The vehicle of claim 2, wherein the mirror assembly further comprises a rotatable shaft member and the first end of the tether is wrapped about the rotatable shaft member.

6. The vehicle of claim 1, further comprising a detent and a notch, and a biasing member that applies a force to at least one of the detent and the notch to urge engagement of the detent and the notch when the mirror assembly is in the second position; wherein the force applied by the biasing member is reduced in response to the opening of the door to facilitate disengagement of the detent and the notch.

7. The vehicle of claim 1, wherein the mechanism further comprises:
    a sensor that detects a door open condition;
    a controller responsive to the sensor to generate an actuation signal when the door is open; and
    an actuator coupled to at least one of the mirror assembly and the door, the actuator responsive to the actuator signal to move the mirror assembly from the second position to the first position when the door is opened.

8. The vehicle of claim 7, further comprising a user-actuated control switch, wherein the controller is responsive to the user-actuated control switch to generate the actuation signal.

9. The vehicle of claim 1, wherein the mechanism further comprises:
    a first magnetic element attached to the mirror assembly; and
    a second magnetic element attached to the body and positioned to be in close proximity to the first magnetic element when the mirror assembly is in the second position and the door is opened, wherein the first and second magnetic elements are configured to exert a repulsive force on each other when placed in close proximity, thereby urging the mirror assembly from the second position to the first position when the door is opened.

10. The vehicle of claim 1, wherein the mechanism further comprises a resilient buffer material placed on at least one of:
    the outside of the mirror assembly at a location that impacts the body when the mirror assembly is in the second position and the door is opened; and
    the body in a location that is impacted by the mirror assembly when the mirror assembly is in the second position and the door is opened.

11. A side mirror assembly for a vehicle having a door mounted to a vehicle body, comprising:
    a mirror having a reflecting surface and a housing that supports the reflecting surface, the mirror pivotally mounted to the door to rotate between at least a first position in which the reflecting surface of the mirror extends in a direction that forms an angle of at least 45 degrees with a longitudinal axis of the vehicle, and a second position in which the reflecting surface of the mirror extends in a direction that forms an angle of less than 45 degrees with the longitudinal axis of the vehicle; and
    a mechanism coupled to the mirror and the door and responsive to the door to rotate the mirror from the second position to the first position when the door is opened.

12. The side mirror assembly of claim 11, wherein the mirror is mounted to the door and the mechanism further comprises:
    a tether passing through at least portion of the door, the tether having a first end attached inside the housing and a second end attached to the body.

13. The side mirror assembly of claim 12, wherein the mirror assembly further comprises a rotatable shaft member and the first end of the tether is wrapped about the rotatable shaft member.

14. The side mirror assembly of claim 12, wherein the mirror assembly further comprises a lever extending from the mirror assembly, and wherein the first end of the tether is attached to the lever.

15. The side mirror assembly of claim 14, wherein the lever comprises an aperture and the first end of the tether is threaded through the aperture and bulged.

16. The side mirror assembly of claim 11 further comprising a detent and a notch, and a biasing mechanism that applies a force to at least one of the detent and the notch to urge engagement of the detent and the notch when the mirror is in the second position, wherein the force applied by the biasing mechanism is reduced in response to the opening of the door to facilitate the disengagement of the detent and the notch.

17. The side mirror assembly of claim 11, wherein the mechanism further comprises:
    a sensor that detects a door open condition;
    a controller responsive to the sensor to generate an actuation signal when the door is open; and
    an actuator coupled to at least one of the mirror and the door, the actuator responsive to the actuator signal to move the mirror from the second position to the first position when the door is opened.

18. The side mirror assembly of claim 11, wherein the mechanism further comprises:
    a first magnetic element attached to the mirror; and a second magnetic element attached to the body and positioned to be in close proximity to the first magnetic element when the mirror is in the second position and the door is opened, wherein the first and second magnetic elements are configured to exert a repulsive force on each other when placed in close proximity, thereby urging the mirror from the second position to the first position when the door is opened.

19. The side mirror assembly of claim 11, wherein the mechanism further comprises a resilient buffer material placed on at least one of:

the outside of the mirror assembly in a location that impacts the body when the mirror is in the second position and the door is opened; and the body in a location that is impacted by the mirror assembly when the mirror assembly is in the second position and the door is opened.

20. A method for protecting a door-mounted mirror on a vehicle during and after an impact, comprising:

rotating the mirror forward during the impact at least 45 degrees from a first operational position to a second position in which the mirror is folded toward a portion of the vehicle body located forward of the door;

opening the door upon which the mirror is mounted; and using a drive mechanism which is at least partially located within a mirror assembly to automatically rotate the mirror rearward toward the first operational position as the door opens so that the mirror does not impact the vehicle body.

* * * * *